United States Patent [19]

Ogawa et al.

[11] 4,055,375
[45] Oct. 25, 1977

[54] ELECTRIC CONTACTING DEVICE

[75] Inventors: Naoki Ogawa; Kazuo Ikawa, both of Yokohama, Japan

[73] Assignee: Nissan Motor Company, Limited, Yokohama, Japan

[21] Appl. No.: 690,790

[22] Filed: May 27, 1976

[30] Foreign Application Priority Data

May 29, 1975 Japan .................................. 50-71468

[51] Int. Cl.² ............................................ H01R 39/00
[52] U.S. Cl. .................................. 339/6 R; 280/751; 339/3 R; 339/10
[58] Field of Search .............. 339/6 R, 3 R, 3 S, 5 M, 339/5 P, 10, 182 R, 182 RS; 280/751

[56] References Cited

U.S. PATENT DOCUMENTS 3,953,095   4/1976   Iino et al. ............................... 339/6 R Primary Examiner—Roy Lake
Assistant Examiner—DeWalden W. Jones
Attorney, Agent, or Firm—Lowe, King, Price & Markva

[57] ABSTRACT

A first annular member provided with at least two different shaped conductive spring arms is fixedly and coaxially connected to a rotatable member for rotatable movement therewith the two spring arms having different characteristic frequencies respectively. A second annular member provided with an annular conductive rail is connected to a relatively stationary member so as to be coaxially spaced apart from the first annular member. The free ends of the conductive spring arms are urged into sliding contact with the annular conductive rail.

19 Claims, 5 Drawing Figures

ELECTRIC CONTACTING DEVICE

The present invention relates to an electric contacting device for continuously providing electric connection between stationary and rotatable electric conductors mounted in a motor vehicle.

Some modernized motor vehicles are equipped with air-cushion systems each of which comprises an air-cushion arranged on a steering wheel in order to preferably protect a driver in an event of vehicle collision. In this type air-cushion system, it is necessary to employ an electric contacting device which can reliably and assuredly transmit an air-cushion operating signal generated in an impact detecting device, positioned in a relatively stationary portion of the vehicle, to an electric gas generating device of the air-cushion mounted on the rotatable steering wheel. In a collision of the vehicle, the transmittance of the air-cushion operating signal from the impact detecting device into the electric gas generating device of the air-cushion must be finished within several milliseconds. Therefore, the electric contact device used in the above-mentioned positioned must be made to ensure continuous and reliable connection between the impact detecting device and the electric gas generating device of the air-cushion even though it has rotatable elements.

One of the devices to achieve the above-mentioned function is an electric contactor employed in a hornsystem, in which a spring arm fastened to a top end portion of a stationary steering shaft housing slidably contacts at the free end thereof a rotatable annular conductive plate concentrically mounted on a central boss of the steering wheel. In this conventional electric contactor, however, the free end of the spring arm is subjected to disconnection from the annular conductive plate when severe vibration of the steering wheel relative to the vehicle body occurs during the vehicle running, more particularly in the case of the vehicle collision. Accordingly, this kind of electric connector can not be used in the air-cushion system by reason of its unreliable connecting function as mentioned.

Therefore, the present invention is presented for overcoming such drawback of the prior art electrical contacting device where an electric connection between a stationary conductive member and a rotatable conductive member is required.

It is an object of the present invention to provide an electronic contacting device which can provide reliable and continuous electrical connection between a stationary electrical conductor and a rotatable conductor rotatable relative to the stationary electrical conductor.

It is another object of the present invention to provide an electric contacting device which can be used for assuredly transmitting an air-cushion operating signal, generated in an impact detecting device mounted on a relatively stationary position of the vehicle, to the gas generating device of the air-cushion mounted on the steering wheel, even under the most severe vibration of the vehicle.

It is still another object of the present invention to provide an electric contacting device which has a plurality of spring arms respectively having different characteristic frequencies so that at least one of the spring arms is maintained to provide the electric connection between the stationary and rotatable conductive members even when the severe vibrations are happened on the vehicle.

Other objects and advantages of the present invention will be apparent from the following detailed description of a preferred embodiment of the invention when taken in conjunction with the accompanying drawings, in which.

Figure 1:
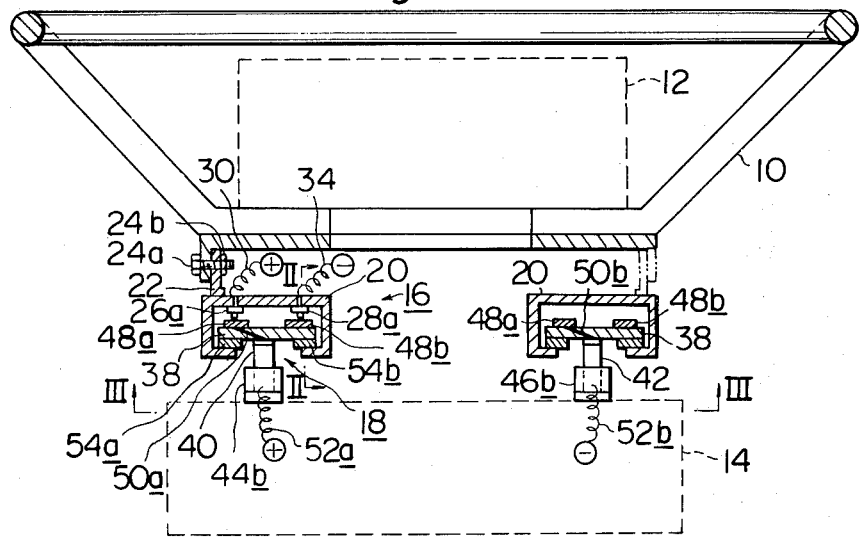
FIG. 1 is a sectional view of an electric connecting device according to the present invention, the device being accompanied with a steering wheel and steering shaft assembly.
Figure 2:
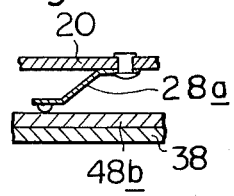
FIG. 2 is a partial sectional view taken on line II—II of FIG. 1.
Figure 3:
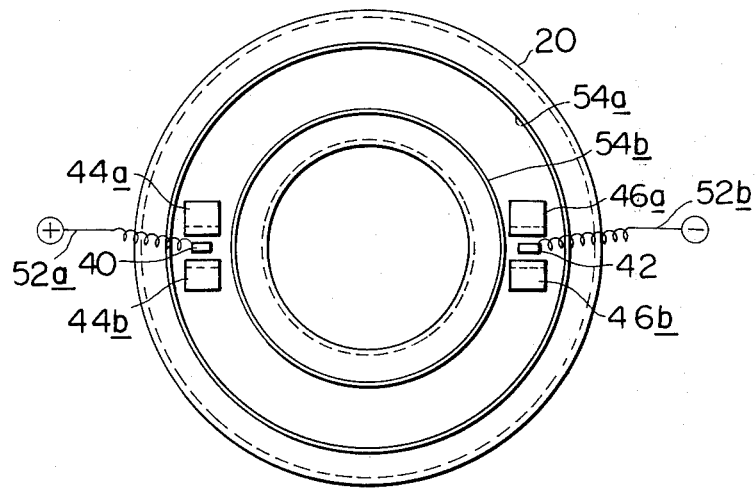
FIG. 3 is a sectional view taken on line III—III of FIG. 1.
Figure 4:
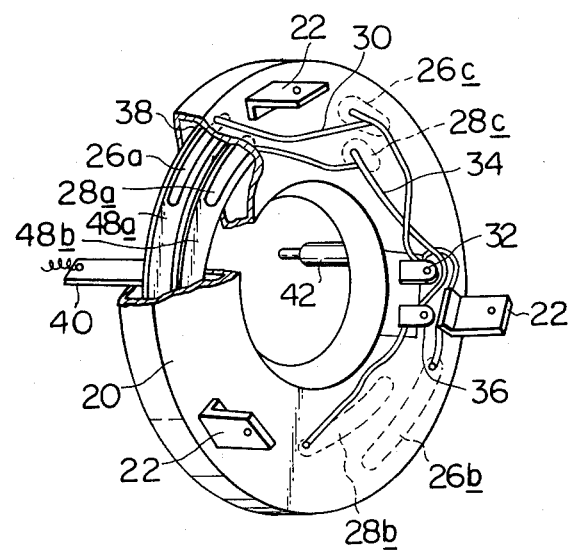
FIG. 4 is a perspective view of the electric connecting device.

Referring now to FIGS. 1 to 4, there is shown a single embodiment of the electric contacting device according to the present invention, in which the device is incorporated with a steering wheel 10 of a conventional steering system. An air-cushion 12 having therein an electric gas generating device (not shown) is mounted on a front side of the steering wheel 10, in this instance, the air-cushion 12 being illustrated in an inoperative condition. The reference numeral 14 indicates a switch box for several control levers such as a trafficator lever and a head light control lever, which box 14 is unitedly mounted on a relatively stationary member such as the steering shaft housing (not shown).

The electric contacting device in this embodiment generally comprises an outer unit 16 fixedly connected to the steering wheel 10, and an inner unit 18 connected to the stationary switch box 14. These units 16 and 18 are concentrically arranged around a steering shaft (not shown) of the steering system while allowing the outer unit 16 rotatable with the steering wheel 10 about the inner unit 18 as will be described hereinlater.

The outer unit 16 includes a cylindrical outer case 20, having a generally concentric annular recess therein, which is constructed of an insulating material and connected to the back side of the steering wheel 10 so as to be coaxial with the steering shaft. In connection of the outer case 20 to the steering wheel 10, three brackets 22 extended from the outer surface of the outer case 20 are used with conventional bolts 24a and nuts 24b as well seen in FIGS. 1 and 4. On the inner surface of the outer case 20 are arranged first group of spring arms 26a, 26b and 26c and second group of spring arms 28a, 28b and 28c which groups of spring arms are respectively positioned along two spaced imaginary annular portions, concentric with the outer case 20, provided on the inner surface of the outer case 20. These spring arms 26a to 26c and 28a to 28c are so formed to be different in size, in material and/or in elastic strength to each other so as to have different characteristic frequencies respectively. Further, each of the spring arms may be so formed to have generally wedge shaped cross section for increasing the mechanical strength thereof. As best seen from FIG. 2, each of the spring arms 26a to 26c and 28a and 28c is firmly connected at one end thereof, by conventional fastening means, to the inner surface and extends at the other end thereof into the annular recess. As well shown in FIG. 4, the first group of spring arms 26a to 26c are connected to a terminal 32 through a first lead wire 30, and in the same way, the second group of spring arms 28a to 28c are connected to another terminal 36 through a second lead wire 34, these terminals 32 and 36 being mounted on the outer surface of the outer case 20 for connecting with respective input terminals of the gas generating device mounted in the air-cushion 12.

Figure 5:
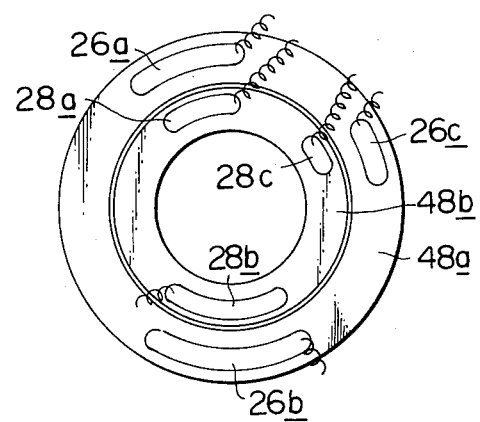
FIG. 5 is a view showing the mutual positional relationship between spring arms and annular conductive plates.

The inner unit 18 includes an annular plate member 38 which is made of an insulating material and is received in the annular recess of the outer case 20 so as to be spaced apart from the inner surfaces of the outer case 20 as shown in FIG. 1. First and second brackets 40 and 42, constructed of conductive materials, extended from the lower side of the annular plate member 38 are connectable at the lower edge portions thereof with the switch box 14 in such a way as will be described next. For the connection of the brackets 40 and 42 to the switch box 14, two pairs of stoppers 44a, 44b and 46a, 46b are provided on the switch box 14 in such a manner that the lower edge portions of the brackets 40 and 42 are positioned between the corresponding two stoppers 44a and 44b, 46a and 46b, respectively. It is now to be noted that the clearance defined by each pair of stoppers 44a and 46b (46a and 46b) must be larger than the thickness of the corresponding bracket 40 (42), so that the annular plate member 38 can slightly rotate about its axis relative to the stationary switch box 14 until one of the lower edge portions of the brackets 40 and 42 contacts either of corresponding stoppers. Coaxially mounted on the upper surface of the annular plate member 38 are spaced first and second annular conductive rails or plates 48a and 48b which are arranged to contact the other ends of the first and second groups of spring arms 26a to 26c and 28a to 28c, respectively, as best seen in FIG. 5. Two lead wires 50a and 50b connect the first and second rails 48a and 48b with the first and second brackets 40 and 42, respectively. Further, other two lead wires 52a and 52b connect the first and second brackets 40 and 42 with output terminals of an impact detecting device (not shown) located in a relatively stationary portion of the vehicle. The electrical connections between the first and second brackets 40, 42 and the impact detecting device may be made through the switch box 14. First and second annular insulators 54a and 54b are concentrically mounted at the one sides thereof beneath the most outer and lower surface portions of the annular plate member 38 while slidably contacting at the outer sides thereof the inner surfaces of flange portions (no numeral) of the outer case 20.

With the above-described construction of the electric contacting device according to the present invention, the following functional feature is obtained.

Since at least two of spring arms having respectively characteristic frequencies are associated with each of the annular conductive rails, at least one of the spring arms on each rail has a great possibility to maintain the contacting connection between them even when severe vibration having resonance frequencies concerning the other spring arms are happened on the vehicle thereby providing continuous electrical connection between the gas generating device of the air-cushion and the impact detecting device.

Although in the previous description, the electric contacting device is shown as accompanying with the vehicle steering system having the air-cushion system, it is also possible to employ such device in a field where an assured electrical connection between a rotatable member and a stationary member is required under violent vibration.

Further, in the previous description, the contacting device is illustrated to employ two annular conductive rails and two groups of spring arms for providing two way electric connections, it is also possible to employ only one annular conductive rail and one group of spring arms for providing one way electric connection if the electric transmittance between the two electric devices is not so critical, such as in a case of horn-system. In such case, the steering shaft will be used for the other electric conductor.

As described above, the present invention is provided to propose a new and improved electric contacting device which can reliably and continuously accomplish electrical connection between a stationary electric device and a rotatable electric device even when under the most severe vibrations or shocks.

While the present invention has been shown in only one embodiment, it will be obvious to those skilled in the art that is not so limited, but is susceptible to various other changes and modifications without departing from the spirit of the present invention.

What is claimed is:

1. An electric contacting device for providing continuous electric connection between first and second electric devices respectively mounted on a rotatable member rotatable about its axis and a relatively stationary member, said electric contacting device comprising:
   a first annular member coaxially securely mounted on said rotatable member;
   a second annular member adapted to connect to said relatively stationary member so as to be coaxially spaced apart from said first annular member;
   a first conductive annular plate coaxially mounted on said second annular member and electrically connected to said second electric device; and
   at least two first conductive spring arms mounted on said first annular member on a first imaginary annular portion which is coaxial with said first annular member, said first conductive spring arms being urged into sliding contact with said first conductive annular plate at the free ends thereof and electrically connected to said first electric device, further said first conductive spring arms being different in size to each other so as to respectively have different characteristic frequencies.

2. An electric contacting device as claimed in claim 1, in which said first conductive spring arms are made of different materials.

3. An electric contacting device as claimed in claim 2, in which said first conductive spring arms are so constructed to have different elastic strength.

4. An electric contacting device as claimed in claim 1, in which said first and second annular members are constructed of insulating materials.

5. An electric contacting device as claimed in claim 4, further comprising:
   at least one bracket having one end connected to said second annular member and the other end extending toward said relatively stationary member, and a pair of stoppers mounted on said relatively stationary member in such a manner that the other end of said bracket is positioned between said pair of stoppers, the clearance defined by said pair of stoppers being larger than the thickness of said brackets, whereby said second annular member can slightly rotate about its axis relative to said relatively stationary member until the other end of said bracket contacts with either of said stoppers.

6. An electric contacting device as claimed in claim 5, in which said bracket is constructed of a conductive material for acting as an intermediate electric conductor of the electric connection between said first conductive annular plate and said second electric device.

7. An electric contacting device as claimed in claim 6, in which said first annular member is formed with an annular recess along the circumference thereof, said annular recess being concentric with said first annular member and spacedly receiving therein said second annular member.

8. An electric contacting device as claimed in claim 1, further comprising:
- a second conductive annular plate coaxially mounted on said second annular member while radially spacing apart from said first conductive annular plate, said second conductive annular plate being electrically connected to said electric device; and
- at least two second conductive spring arms mounted on said first annular member on a second imaginary annular portion which is concentric with said first imaginary annular portion, and said second conductive spring arms being different in size to each other and urged into sliding contact with said second conductive annular plate and electrically connected to said first electric device.

9. An electric contacting device as claimed in claim 8, in which said second conductive spring arms are made of different materials.

10. An electric contacting device as claimed in claim 9, in which said second conductive spring arms are so constructed to have different elastic strength.

11. An electric contacting device as claimed in claim 8, in which said first and second annular members are constructed of insulating materials.

12. An electric contacting device as claimed in claim 11, further comprising two spaced brackets each of which has one end connected to said second annular member and the other end extending toward said relatively stationary member, and two pairs of stoppers each pair of which are mounted on said relatively stationary member in such a manner that the other end of each of said brackets is positioned between said each pair of stoppers, the clearance defined by each pair of stoppers being larger than the thickness of said each bracket, whereby said second annular member can slightly rotate about its axis relative to said relatively stationary member until the other end of said each bracket contacts with either of said each pair of stoppers.

13. An electric contacting device as claimed in claim 12, in which said two brackets are constructed of conductive materials for acting as respective intermediate electric conductors of the electric connection between said first and second conductive annular members and said second electric device individually.

14. An electric contacting device as claimed in claim 13, in which said first annular member is formed with an annular recess along the circumference thereof, said annular recess being concentric with said first annular member and spacedly receiving therein said second annular member.

15. An electric contacting device for providing continuous electrical connection between an electrical gas generating device of an air-cushion mounted on a portion of a steering wheel and an impact detecting device mounted on a relatively stationary portion of a motor vehicle, said electric contacting device comprising:
- a first annular member coaxially and securely mounted on a back portion of said steering wheel;
- a second annular member adapted to connect to said relatively stationary member so as to coaxially space apart from said first annular member;
- first and second conductive annular plates coaxially mounted on said second annular member in a spaced relationship and electrically individually connected to said impact detecting device; and
- at least two first spring arms and at least two second spring arms, of conductive materials, mounted on said first annular member on first and second imaginary spaced annular portions which are coaxial with said first annular member, said first and second spring arms being urged into sliding contact with said first and second conductive annular plates respectively at the free ends thereof and electrically individually connected to said electrical gas generating device, further said first and second spring arms being different in size to each other so as to have different characteristic frequencies respectively.

16. An electric contacting device as claimed in claim 15, in which said first and second conductive spring arms are made of different materials.

17. An electric contacting device as claimed in claim 16, in which said first and second conductive spring arms are so constructed to have different elastic strength.

18. An electric contacting device as claimed in claim 17, further comprising:
- two spaced brackets having one ends connected to said second annular member and the other ends extending toward said relatively stationary member; and
- two pairs of stoppers, each pair of stoppers being mounted on said relatively stationary member in such a manner that the other end of each of said brackets is positioned between said each pair of stoppers, the clearance defined between said each pair of stoppers being larger than the thickness of said each bracket, whereby said second annular member can slightly rotate about its axis relative to said relatively stationary member until the other end of said each bracket contacts with either of said each pair of stoppers.

19. An electric contacting device as claimed in claim 18, in which each of said two brackets is constructed of a conductive material for acting as an intermediate electric conductor of the electric connection between said first and second conductive annular members and said impact detecting device individually.

* * * * *